United States Patent [19]

Hideshima

[11] 3,919,699

[45] Nov. 11, 1975

[54] MEMORY CIRCUIT

[75] Inventor: Yasuhiro Hideshima, Tokyo, Japan

[73] Assignee: Sony Corporation, Tokyo, Japan

[22] Filed: June 28, 1974

[21] Appl. No.: 484,313

[30] Foreign Application Priority Data

June 30, 1973 Japan ........................ 48-77693[U]

[52] U.S. Cl. ........................ 340/173 CA; 320/1

[51] Int. Cl.$^2$ ........................ G11C 11/24; G11C 7/00

[58] Field of Search ........................ 340/173 CA; 320/1

[56] References Cited

UNITED STATES PATENTS

| | | | |
|---|---|---|---|
| 3,646,525 | 2/1972 | Linton et al. | 340/173 CA |
| 3,652,914 | 3/1972 | Krausser | 340/173 CA |

*Primary Examiner*—Stuart N. Hecker

*Attorney, Agent, or Firm*—Lewis H. Eslinger; Alvin Sinderbrand

[57] ABSTRACT

A memory circuit is disclosed in which a first capacitor is connected in parallel between the gate and common electrodes of an insulated gate field effect transistor, the gate electrode thereof is connected through a first switching element to one end of a second capacitor, the other end of the second capacitor is connected to the common electrode of the insulated gate field effect transistor, a second switching element is connected in series between the connection point of the first switching element and the second capacitor and an input terminal, and an output terminal is led out from the output electrode of the insulated gate field effect transistor, and in which the first and second switching elements are controlled to be ON and OFF in ganged relation.

3 Claims, 2 Drawing Figures

MEMORY CIRCUIT

BACKGROUND OF THE INVENTION

1. Field of the Invention

The present invention relates generally to a memory circuit, and more particularly to an improved memory circuit which includes an insulated gate field effect transistor and a capacitor.

2. Description of the Prior Art

A prior art memory circuit including an insulated gate field effect transistor and a capacitor will be now described with reference to FIG. 1. In FIG. 1, reference letter Q indicates a MOS field effect transistor (which will hereinafter be referred to as simply a MOS FET). A capacitor C is connected in parallel between the gate electrode and the common electrode (which is the source or drain electrode and grounded) of the MOS FET Q, and a series circuit of a resistor (buffer resistor) $R_1$ and a switching element SW is connected in series between an input terminal 1 and the gate electrode of the MOS FET Q. The output electrode (drain or source electrode) of the MOS FET Q, from which an output terminal 2 is led out, is connected to a voltage source B through a load resistor $R_2$.

With the prior art memory circuit, when the switching element SW is in ON-state, the capacitor C is charged or discharged through the resistor $R_1$ and switching element SW by a voltage applied between the input terminal 1 and the ground and a predetermined amount of charge is stored in the capacitor C. While, when the switching element SW is in OFF-state, the charge stored in the capacitor C is hardly discharged (due to high input impedance of the MOS FET Q) and kept, as it is, to deliver a memorized output in accordance with the terminal voltage across the capacitor C between the output terminal 2 and the ground.

As the capacitor C used in the prior art memory circuit, such a capacitor which is relatively large in leakage resistance is desired, but the capacitor with large leakage resistance has a small capacity correspondingly. However, when the capacitor C is small in capacity, a pop noise is apt to appear in the memorized output when the difference between the input voltage and the terminal voltage of the capacitor C is large and the switching element SW is in ON-state, which is not preferred.

SUMMARY OF THE INVENTION

According to the present invention, there is provided a memory circuit in which a first capacitor is connected in parallel between the gate and common electrodes of an insulated gate field effect transistor, the gate electrode thereof is connected through a first switching element to one end of a second capacitor, the other end of the second capacitor is connected to the common electrode of the insulated gate field effect transistor, a second switching element is connected in series between the connection point of the first switching element and the second capacitor and an input terminal, and an output terminal is led out from the output electrode of the insulated gate field effect transistor, and in which the first and second switching elements are controlled to be ON and OFF in ganged relation.

It is an object of the present invention to provide a memory circuit free from the defects encountered in the prior art.

It is another object of the invention to provide a memory circuit which has a long time period of memory.

It is a further object of the invention to provide a memory circuit which can substantially avoid the generation of a pop noise in a memoried output when a switching element is made ON.

The other objects, features and advantages of the present invention will become obvious from the following description taken in conjunction with the accompanying drawing.

DESCRIPTION OF THE PREFERRED EMBODIMENT

Figure 1:
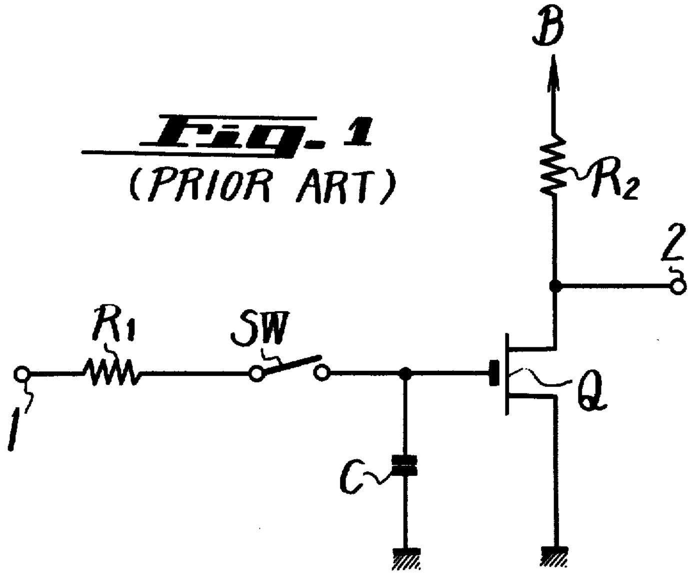
Fig. 1 (PRIOR ART)
FIG. 1 is a connection diagram showing a prior art memory circuit.

An embodiment of the memory circuit according to the present invention will be hereinbelow described with reference to FIG. 2 in which reference numerals and letters corresponding to those used in FIG. 1 show the corresponding elements and hence their description will be omitted for the sake of simplicity.

Figure 2:
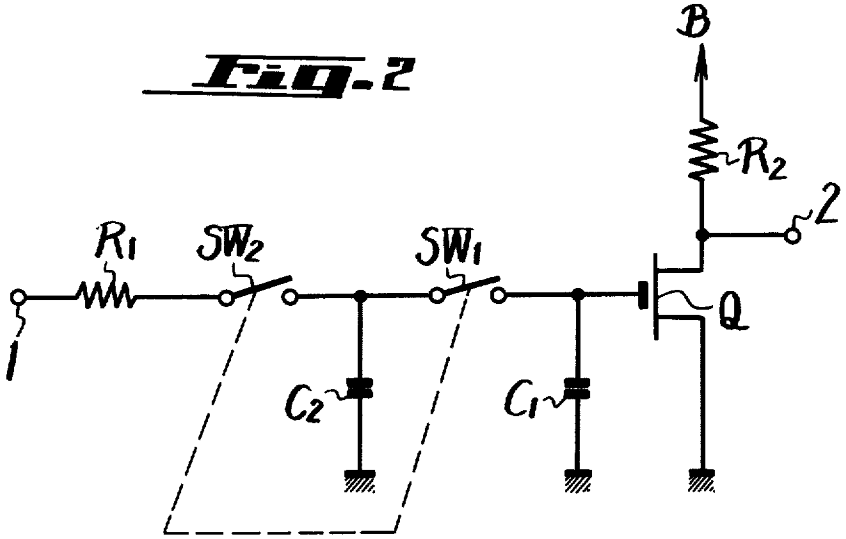
FIG. 2 is a connection diagram showing an embodiment of the memory circuit according to the present invention.

In the embodiment of the invention shown in FIG. 2, a first capacitor $C_1$ is connected in parallel between the gate electrode and the common electrode (source or drain electrode) of an insulated gate field effect transistor or MOS FET Q (in the illustrated embodiment). The gate electrode of the MOS FET Q is connected through a first switching element $SW_1$ to one of a second capacitor $C_2$ the other end of which is connected to the common electrode of the MOS FET Q. A second switching element $SW_2$ is connected in series between the input terminal 1 and the connection point of the first switching element $SW_1$ and the second capacitor $C_2$ through the resistor $R_1$, and the output terminal 2 is led out from the output electrode (drain or source electrode) of the MOS FET Q. In the present invention, the first and second switching elements $SW_1$ and $SW_2$ are controlled to be ON and OFF in ganged relation.

In this case, a capacitor which has a large leakage resistance (for example, its discharge time constant is several days) is used as the first capacitor $C_1$, and a capacitor which has a large capacity (for example, its discharge time constant is several hours) is desired to be used as the second capacitor $C_2$.

An operation of the memory circuit of the present invention will be now described. With the first and second switching elements $SW_1$ and $SW_2$ are made ON at the same time, the first and second capacitors $C_1$ and $C_2$ are connected in parallel with each other by the ON-state switching element $SW_1$. The capacitors $C_1$ and $C_2$ are charged or discharged in response to an input voltage applied across the input terminal 1 and the ground, and terminal voltages of the capacitors $C_1$ and $C_2$ are made to be predetermined values, respectively. After the switching elements $SW_1$ and $SW_2$ turn to OFF-state at the same time, the respective terminal voltages across the capacitors $C_1$ and $C_2$ are kept at the values therein, respectively. An memorized output voltage is delivered between the output terminal 2 and the ground based upon the terminal voltage across the first capacitor $C_1$. In this case, the respective terminal voltages across the capacitors $C_1$ and $C_2$ at the time when the switching elements $SW_1$ and $SW_2$ are both in OFF-state decrease gradually in response to the discharge time constants of the respective transistors $C_1$ and $C_2$ (but the first capacitor $C_1$ has a relation to the input impedance of the MOS FET Q).

With the memory circuit of the invention described above, the first capacitor $C_1$ is connected in parallel between the gate and common electrodes of the insulated gate field effect transistor Q; the gate electrode thereof is connected through the first switching element $SW_1$ to one end of the second capacitor $C_2$; the other end of the second capacitor $C_2$ is connected to the common electrode of the insulated gate field effect transistor Q; the second switching element $SW_2$ is connected in series between the connection point of the first switching element $SW_1$ and the second capacitor $C_2$ and the input terminal 1; and the output terminal 2 is led out from the output electrode of the insulated gate field effect transistor Q. Further, the first and second switching elements $SW_1$ and $SW_2$ are controlled to be ON and OFF in ganged relation. Therefore, the memory time period can be prolonged by using a capacitor, which is large in leakage resistance (and hence small in capacity), as the first capacitor $C_1$, and when the first and second switching elements $SW_1$ and $SW_2$ are both in ON-state, the second capacitor $C_2$ is connected in parallel to the first capacitor $C_1$ to make the capacity large as compared with the capacity where only the first capacitor $C_1$ is connected. As a result, even if there exists a large voltage difference between an input voltage and the terminal voltage across the first capacitor $C_1$, it is avoided that a pop noise appears in the memorized output when the first and second switching elements $SW_1$ and $Sw_2$ are both in ON-state. Further, if the capacity of the second capacitor $C_2$ is increased, the generation of the pop noise is reduced so much. In this case, the decrease of the leakage resistance accompanyed with the increase in capacity of the second capacitor $C_2$ has no affect on the memorizing time period.

If the second capacity $C_2$ is large in capacity, an external noise is by-passed by the second capacitor $C_2$ so much, so that the affect of the noise on the memorized output is reduced.

When contents of the memory in the memory circuit is changed immediately, since the difference between the terminal voltages of the first and second capacitors is small, a fear that the pop noise appears in the memorized output is further reduced.

Although in the above description the MOS FET is exemplified as the insulated gate field effect transistor, there is no need to restrict the insulated gate field effect transistor to the MOS FET, but other types of insulated gate field effect transistors can be employed as the insulated gate field effect transistor of the present invention with the same effects.

It will be obvious that many modifications and variations could be effected by those skilled in the art without departing from the spirits and scope of the novel concepts of the present invention.

I claim as my invention:

1. A memory circuit, comprising:

an input terminal for receiving an input voltage to be stored;

an insulated gate field effect transistor having a gate electrode to which a stored voltage is applied, an output electrode for producing an output voltage proportional to said stored voltage, and a common electrode;

a first capacitor having high leakage resistance connected between said gate electrode and said common electrode for storing said input voltage and for applying same to said gate electrode;

a second capacitor for receiving said input voltage and having one terminal connected to said common electrode and a second terminal;

first switch means for connecting said second terminal of said second capacitor to said gate electrode so that said first and second capacitors are connected in parallel; and second switch means ganged for simultaneous operation with said first switch means for connecting said first and second capacitors to said input terminal to enable said input voltage to be applied thereto, whereby when said first and second switch means are opened, only said first capacitor is connected to said insulated gate field effect transistor to supply said stored voltage thereto.

2. A memory circuit claimed in claim 1, wherein the capacitance of the first capacitor is smaller than that of the second capacitor.

3. A memory circuit claimed in claim 1, wherein said insulated gate field effect transistor is a MOS FET.

* * * * *